N. C. SAMPLE.
Whiffletree.
No. 111,007.
Patented Jan 17, 1871.
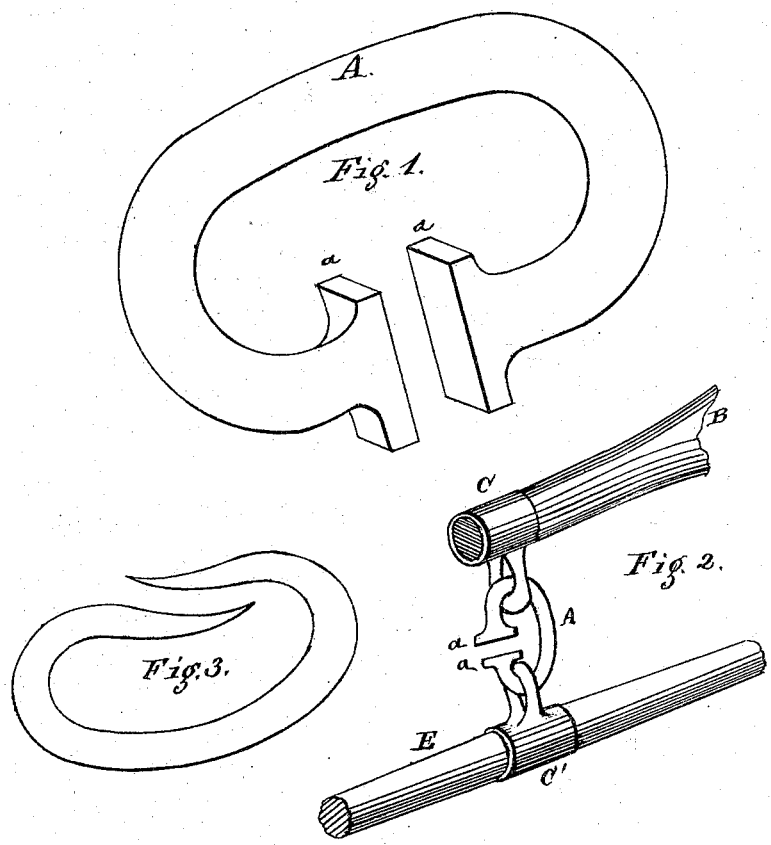
Witnesses,
Hugh Ramby
Ambrose Gable
Inventor,
Newton C. Sample

United States Patent Office.

NEWTON C. SAMPLE, OF PENNINGTONVILLE, PENNSYLVANIA.

Letters Patent No. 111,007, dated January 17, 1871.

IMPROVEMENT IN OPEN LINKS FOR COUPLING DOUBLE AND WHIFFLETREES.

The Schedule referred to in these Letters Patent and making part of the same.

I, NEWTON C. SAMPLE, of Penningtonville, in the county of Chester and State of Pennsylvania, have invented an Improved Open Link for Coupling, of which the following is a specification.

The object of my invention is to provide an open-link for coupling the single-tree to the double-tree without the sharp or tapered overlapping ends, as in the common open-link in use, so apt to injure horses when backing up against them, as experience has proved those links not only dangerous, but apt, also, to catch the links of the traces, and cause vexation and delay, but one without those objections, and quite as simple in its application, and fully as efficient.

The accompanying drawing clearly shows the link and its application.

Figure 1, the link detached.

Figure 2, its application in coupling the single-tree E to the double-tree B.

Figure 3 illustrates the ordinary open-link referred to, with its pointed ends.

This improved open-link A, of the desired size and strength, has a foot, a, on each end, projecting on both sides, with space sufficient between them to insert another link or iron loop, or frigen C, as shown on the end of the double-tree B, and C', centrally, on the single-tree E.

These blunted and projecting feet or cross-ends a will prevent the uncoupling by any chance position or movement of the connected parts, but by hand the coupling and uncoupling are readily performed.

Simple and useful as this open-link is, I am not aware that it has ever been used. I am aware, however, that patent No. 19,955, April 13, 1858, claims a shackle or chain-link, made in two parts, and with one of them formed in one piece as a double hook, and space between the extremities, with tenons for the other piece to fit in and lap over the hooks; such a link or shackle I do not claim.

What I claim as my invention, and desire to secure by Letters Patent, is—

An open-link, A, with its extremities a turned out on both sides, in the manner shown and for the purpose specified.

NEWTON C. SAMPLE.

Witnesses:
 HUGH RAMBO,
 AMBROSE GABLE.